(12) United States Patent
Hochgesang

(10) Patent No.: US 6,812,294 B2
(45) Date of Patent: Nov. 2, 2004

(54) SOLVENTLESS LIQUID NITRILE COMPOUNDS

(75) Inventor: Paul J. Hochgesang, Ann Arbor, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 10/328,738

(22) Filed: Dec. 23, 2002

(65) Prior Publication Data

US 2003/0131934 A1 Jul. 17, 2003

Related U.S. Application Data

(60) Provisional application No. 60/342,235, filed on Dec. 21, 2001.

(51) Int. Cl.[7] ............................................. C08F 120/44
(52) U.S. Cl. ............................. 525/329.1; 525/329.2; 525/387; 525/238
(58) Field of Search ........................ 525/329.1, 332.6, 525/238

(56) References Cited

U.S. PATENT DOCUMENTS

| | | | | |
|---|---|---|---|---|
| 3,652,360 A | * | 3/1972 | Hartman et al. | 156/244.11 |
| 3,856,914 A | * | 12/1974 | Maeda et al. | 264/41 |
| 3,894,979 A | * | 7/1975 | Samples | 528/50 |
| 3,931,074 A | | 1/1976 | Gomez | 260/23 |
| 4,048,261 A | | 9/1977 | Starmer | 260/888 |
| 4,355,139 A | | 10/1982 | Coran et al. | 525/133 |
| 4,421,884 A | | 12/1983 | Oyama et al. | 524/209 |
| 4,481,335 A | * | 11/1984 | Stark, Jr. | 525/261 |
| 4,486,480 A | | 12/1984 | Okumoto et al. | 428/36 |
| 4,585,826 A | * | 4/1986 | Graves | 524/534 |
| 4,654,404 A | * | 3/1987 | Watanabe et al. | 525/315 |
| 4,696,984 A | | 9/1987 | Carbonaro et al. | 526/98 |
| 4,725,637 A | * | 2/1988 | Fernyhough et al. | 524/271 |
| 4,833,195 A | | 5/1989 | Adur et al. | 524/528 |
| 4,843,128 A | | 6/1989 | Cesare | 525/193 |
| 4,921,912 A | | 5/1990 | Sagawa et al. | 525/112 |
| 4,960,829 A | | 10/1990 | Allen et al. | 525/193 |
| 4,980,406 A | * | 12/1990 | Lam | 525/426 |
| 5,000,981 A | | 3/1991 | McGarry et al. | 427/44 |
| 5,068,275 A | | 11/1991 | Wiseman | 524/314 |
| 5,080,942 A | | 1/1992 | Yau | 428/349 |
| 5,149,895 A | | 9/1992 | Coolbaugh et al. | 585/507 |
| 5,239,000 A | | 8/1993 | Kim et al. | 525/133 |
| 5,288,937 A | | 2/1994 | Coolbaugh et al. | 585/507 |
| 5,310,598 A | * | 5/1994 | Yoshinaka et al. | 428/328 |
| 5,387,730 A | | 2/1995 | Coolbaugh et al. | 585/10 |
| 5,510,548 A | | 4/1996 | Coolbaugh et al. | 585/12 |
| 5,545,783 A | | 8/1996 | Coolbaugh et al. | 585/12 |
| 5,548,028 A | | 8/1996 | Tabb | 525/194 |
| 5,551,707 A | | 9/1996 | Pauley et al. | 277/233 |
| 5,625,100 A | | 4/1997 | Coolbaugh et al. | 585/12 |
| 5,633,341 A | | 5/1997 | Abend | 528/335 |
| 5,844,021 A | | 12/1998 | Koblitz et al. | 523/173 |
| 5,844,047 A | | 12/1998 | Abend | 525/327.7 |
| 5,912,288 A | | 6/1999 | Nishimoto et al. | 524/114 |
| 5,958,530 A | | 9/1999 | Jeitner | 428/35.7 |
| 6,120,869 A | | 9/2000 | Cotsakis et al. | 428/42.3 |
| 6,162,847 A | | 12/2000 | Fujimoto et al. | 524/120 |
| 6,214,922 B1 | | 4/2001 | Campomizzi | 524/511 |
| 6,232,403 B1 | | 5/2001 | Blumler et al. | 525/191 |
| 6,238,787 B1 | | 5/2001 | Giles et al. | 428/343 |
| 6,265,474 B1 | * | 7/2001 | Fujimoto et al. | 524/120 |
| 6,268,056 B1 | | 7/2001 | Mills | 428/416 |
| 6,291,374 B1 | | 9/2001 | Landi | 442/237 |
| 2002/0045046 A1 | * | 4/2002 | Sasaki et al. | 428/408 |

FOREIGN PATENT DOCUMENTS

| | | | | |
|---|---|---|---|---|
| DE | 195 05 451 A1 | * | 3/1996 | ............. C08L/9/02 |
| FR | 1465674 | * | 12/1965 | |
| JP | 2-163139 A | * | 6/1990 | ............. C08L/9/02 |
| JP | 2-1631139 A | * | 6/1990 | ............. C08L/9/02 |
| JP | 4-28784 A | * | 1/1992 | ............. C09K/3/10 |
| JP | 6-248240 A | * | 9/1994 | ............. C09J/7/02 |
| JP | 8-198951 A | * | 8/1996 | ............. C08G/59/40 |
| JP | 9-309975 A | * | 12/1997 | ............. C08L/9/00 |
| JP | 2001-302849 A | * | 10/2001 | ............. C08L/9/02 |
| JP | 2002-265681 A | * | 9/2002 | ............. C08L/9/02 |

OTHER PUBLICATIONS

JP 8–198951 (abstract—attached to patent).*
JP 8–198951 (English translation—separate).*
JP 2001–302849 (abstract—attached to patent).*
JP 2001–302849 (English translation—separate).*

* cited by examiner

Primary Examiner—David W. Wu
Assistant Examiner—Rip A. Lee
(74) Attorney, Agent, or Firm—Ronald W. Wangerow; Gary M. Sutter

(57) ABSTRACT

In one embodiment, this invention relates to a solventless liquid nitrile compound. The compound includes a liquid nitrile rubber. The compound also includes a curing agent selected from sulfur and/or sulfur donors. The curing agent is present in an amount of at least about 3% by weight of the compound. The compound contains substantially no solvent. In another embodiment, this invention relates to a solventless liquid nitrile compound. The compound includes a liquid nitrile rubber. The compound also includes a nonsulfur curing agent. The curing agent is present in an amount of at least about 5% by weight of the compound. The compound contains substantially no solvent.

11 Claims, No Drawings

SOLVENTLESS LIQUID NITRILE COMPOUNDS

CROSS-REFERENCE TO RELATED APPLICATION

This application claims the benefit of U.S. provisional application Ser. No. 60/342,235, filed Dec. 21, 2001.

BACKGROUND OF THE INVENTION

This invention relates in general to elastomeric compositions, and in particular to compounds made with a liquid nitrile rubber.

Liquid nitrile rubbers are conventionally used in a minor amount as a plasticizer or processing aid in combination with a solid elastomer in preparing a rubber compound. It has not previously been thought to use liquid nitrile rubbers as the base elastomer for making a compound, and then to cure the liquid nitrile rubbers.

Rubber compounds are conventionally made by mixing the elastomer(s) and other chemicals together in an organic solvent, or in an aqueous solvent to prepare an emulsion. It has not previously been thought to prepare a liquid nitrile rubber compound without the use of a solvent, and there has been no suggestion how to prepare the compound in a solventless process. Such a process is contrary to the conventional thinking.

SUMMARY OF THE INVENTION

In one embodiment, this invention relates to a solventless liquid nitrile compound. The compound includes a liquid nitrile rubber. The compound also includes a curing agent selected from sulfur and/or sulfur donors. The curing agent is present in an amount of at least about 3% by weight of the compound. The compound contains substantially no solvent.

In another embodiment, this invention relates to a solventless liquid nitrite compound. The compound includes a liquid nitrite rubber. The compound also includes a nonsulfur curing agent. The curing agent is present in an amount of at least about 5% by weight of the compound. The compound contains substantially no solvent.

Various objects and advantages of this invention will become apparent to those skilled in the art from the following detailed description of the preferred embodiment.

DETAILED DESCRIPTION OF THE PREFERRED EMBODIMENT

The liquid nitrite compounds of the invention use liquid nitrite rubbers as the base material for the compounds. Surprisingly, the compounds are made with substantially no solvent, e.g., not more than about 2% solvent. It has been discovered that liquid nitrite compounds having excellent properties can be made without solvent by using an increased amount of curing agent compared to conventional methods.

The solventless liquid nitrite compounds of the invention contain a liquid nitrite rubber, a curing agent, and optionally other curing chemicals and other compounding ingredients as described below.

The Liquid Nitrile Rubber

The liquid nitrite rubber can be any suitable type of liquid nitrile-containing rubber, such as acrylonitrile-butadiene rubber (NBR), acrylonitrile-isoprene rubber, acrylonitrile-pentadiene rubber, acrylonitrile-chloroprene rubber and the like. One nonlimiting example is NIPOL® 1312 or 1312LV manufactured by Zeon Chemicals, Louisville, Ky. and Tokyo, Japan. Preferably, the liquid nitrite rubber is present in an amount between about 40% and about 97% by weight of the compound.

Optional Solid Elastomer

In some applications, it may be desirable to add to the compound a solid nitrite rubber having a Mooney value of not more than about 75. A low Mooney nitrite rubber can be added to improve the physical properties of the liquid nitrite without substantial loss in its flowability and processability. Preferably, the amount of the solid nitrite rubber is not more than about 49% by weight of the total rubber.

The Curing Agent

The curing agent (vulcanizing agent) can be any type suitable for curing the liquid nitrite rubber. Some typical curing agents include sulfur, sulfur donors, and nonsulfur curing agents such as peroxides, metal oxides, difunctional resins, and amines. Sulfur donors include sulfur-containing chemicals such as tetramethylthiuram disulfide (TMTD), dipentamethylenethiuram hexasulfide (DPTH), bis(2,2'-benzothiazolyl) disulfide or benzothiazyldisulfide (MBTS), and dimorpholinyl disulfide (DTDM).

Any suitable type of sulfur can be used. A nonlimiting example of a suitable sulfur is Spider® brand sulfur manufactured by C. P. Hall, Chicago, Ill.

Any suitable type of peroxide curing agent can be used. Some nonlimiting examples of peroxide curing agents are Varox® DBPH-50, a 50% 2,5-dimethyl-2,5-di (t-butyl-peroxyl) hexane manufactured by R. T. Vanderbilt Co., Norwalk, Conn.; Vul-Cup® 40KE manufactured by Hercules, Inc., Wilmington, Del.; Cadox® TS-50 manufactured by Akzo Chemical, Chicago, Ill.; and MEK (methyl ethyl ketone) peroxides.

The liquid nitrile compounds contain an increased amount of curing agent compared to conventional rubber compounds. When the curing agent is a sulfur and/or a sulfur donor, the curing agent is usually present in an amount of at least about 3% by weight of the compound, and preferably between about 3% and about 10%. When the curing agent is a nonsulfur curing agent, the curing agent is usually present in an amount of at least about 5% by weight of the compound, and preferably between about 5% and about 12%.

Other Curing Chemicals

The compounds can also optionally include other curing chemicals, such as activators, crosslinking enhancers, accelerators, and/or retarders. Any suitable type of activator can be used. Some nonlimiting examples of activators are zinc oxide, stearic acid, combinations of zinc oxide and stearic acid, other metal oxides, other fatty acids, and phosphonium salts.

Any suitable type of crosslinking enhancer can be used. A nonlimiting example is TAIC (triallyl isocyanurate), which is manufactured by companies such as Nippon Kasei Chemical, Iwaki, Japan, and Aldrich Chemical Co., Milwaukee, Wis. Another example is Ricon® 152, a homopolymer of butadiene (MW 2,900), which is manufactured by Sartomer, Exton, Pa.; SR-351, trimethylol propane triacrylate, manufactured by Sartomer, Exton, Pa.; and B5405, which is 75% SR-350 (trimethylol propane trimethacrylate) and 25% inert filler acting as a carrier.

If desirable, any suitable type of accelerator can be used. Some nonlimiting examples of accelerators are hexamethylenetetramine, mercaptobenzothiazoles, sulfenamides, thiurams, dithiocarbamates, and guanidines. Also, any suitable type of retarder can optionally be used. Some nonlimiting examples of retarders are organic acids and anhydrides, cyclohexylthiophthalimide, and sulfenamide.

Other Compounding Ingredients

The compounds can also optionally include other compounding ingredients, such as fillers, bonding agents, antidegradants, process oils, plasticizers, coloring agents, or other desirable ingredients. Any suitable type of filler can be used. Some typical fillers are carbon black, silica, and clay. Nonlimiting examples of suitable fillers include Sterling® 6630 carbon black, manufactured by Cabot Corporation, Alpharetta, Ga.; FK140 or FK160 silica manufactured by Degussa AG, Dusseldorf, Germany; and CAB-O-SIL® TS-530, a very hydrophobic fumed silica, manufactured by Cabot Corp.

Some nonlimiting examples of bonding agents useful in the compounds are resorcinol (1,3-dihydroxybenzene); and A-151, a vinyl triethoxy silane, which is manufactured by Huayuan Fine Chemicals, Wuhan, China.

Any suitable type of antidegradant can be used, such as antioxidants, antiozonants, and heat stabilizers. Some typical antioxidants are secondary amines, phenolics, and phosphites. A nonlimiting example of a suitable antioxidant is Naugard® 445 antioxidant, which is a 4,4'-di(alpha, alpha-dimethyl-benzyl)diphenylamine, manufactured by Uniroyal Chemical Co., Waterbury, Conn.

Any suitable type of process oil can be used, such as petroleum oils or vegetable oils. Some nonlimiting examples of process oils include Sanper® 2280 paraffinic oil, manufactured by Nippon Sun Oil K. K., Japan; and Chevron ParaLux® Process Oil 6001R, a highly saturated white paraffinic process oil with very low aromatic content, manufactured by ChevronTexaco Corp., San Ramon, Calif. Also, any suitable type of plasticizer can be used, such as petroleum oils.

Optionally, a coloring agent can be added to the compounds. Some nonlimiting examples of coloring agents are man-made mineral pigments such as the Geode® series (e.g., Geode® V-11633 Kelly Green); and the NEOLOR® series of inorganic pigments (e.g., NEOLOR® Red S), both manufactured by Ferro Corp., Cleveland, Ohio.

Processing

The solventless liquid nitrile compounds can be processed in any suitable manner. Typically, the chemicals are mixed together using any suitable mixing equipment, such as planetary mixers (e.g., Ross mixers), internal mixers, two-roll mills, open roll mills or the like. The mixed compound is then applied, pressed, or molded depending on the particular use. Then, the compound is cured using any suitable time and temperature profile. Typically, the compound is cured at a temperature between about 300° F. and about 400° F. for a time between about 3 minutes and about 20 minutes. The compound can be further post cured if desired or necessary, e.g., for 2 to 14 days at 70° F. to 400° F.

Applications

The compounds of the invention can be used in many different applications. Advantageously, the compounds are flowable so that they can take the place of materials such as liquid silicones in many applications. Preferably, the compounds have a viscosity not more than about 50% greater than that of liquid silicones, more preferably not more than about 25% greater, and most preferably not more than about 10% greater. Unlike liquid silicones, the compounds are impermeable to fluids, so their use is beneficial in applications where it is desired to limit the flow of fluids, such as in engine seals to limit the flow of VOC's through the engine. The compounds are also easier to process than liquid silicones. The flowability of the compounds allows them to be applied instead of molded, which can save the costs typically associated with molding. Of course, the compounds can also be molded if desired, and their use is not limited to flowable applications.

Some nonlimiting examples of typical applications include use as sealing members (e.g., gaskets, O-rings, packings or the like) which can be used in many different applications, such as sealing with respect to engine oil, gear oil, transmission oil, or power steering fluid. For example, the compounds can be used for cure in place gasketing (CIPG), inject in place gasketing (IJPG), and form in place gasketing (FIPG). They can be applied robotically thereby resulting in a dispensed sealing bead. The compounds are suitable for making thin seals such as thin layered gaskets, and for making intricate seals and gaskets. They can be used to fill intricate channels in a metal plate. A thin gasket can be injection molded onto a plastic or metal carrier.

The compounds can be used in liquid injection molding (LIM), transfer molding (TM), injection molding.

The compounds can be used to make rubber-coated metal (RCM) products and rubber-coated plastic products. The compounds cure and bond well to the metal and plastic.

The compounds can be used as a screen printing material. Because of their low viscosity, lower pressures are required during the forming process which allows for complicated manufacturing using pressure sensitive material as an integral part of the forming process.

The compounds can be used as a fabric coating in many different applications, e.g., as a coating on airbags or interior portions of airplanes. The compounds can be used as a repair material, e.g., to fill in little holes in bumpers.

Since the compounds are solventless, they can be easily applied by workers without the hazards of breathing in fumes. The compounds can be applied by any suitable method. The compounds can be applied and will cure at room temperature.

EXAMPLES

Some nonlimiting examples of compounds according to the invention were prepared as follows:

| | | | | |
|---|---|---|---|---|
| Liquid Nitrile | 100.0 | 100.0 | | |
| Varox DBPH-50 | 8.0 | 12.0 | | |
| ZnO | 1.5 | 2.25 | | |
| Liquid Nitrile | 50.0 | 50.0 | 50.0 | |
| ZnO | 0.75 | 0.75 | 0.75 | |
| Varox | 6.0 | 3.0 | 5.0 | |
| B5405 | 1.0 | 1.0 | 1.0 | |
| 6630 | 25.0 | 25.0 | 25.0 | |
| Liquid Nitrile | 50.0 | 50.0 | 50.0 | 50.0 |
| ZnO | 0.75 | 0.75 | 0.75 | 0.75 |
| Varox | 6.0 | 6.0 | 6.0 | 6.0 |
| 5405 | 1.0 | 1.0 | 1.0 | 1.0 |
| FK-140 | 18 | 12 | 12 | 12 |
| A-151 | 1.0 | 1.0 | — | — |
| Neolor Red S | — | 1.0 | 0.5 | 0.5 |
| SR 351 | — | — | — | 0.3 |
| Ricon 152 | — | — | — | 1.0 |
| TS-50 | — | — | — | 1.2 |
| Liquid Nitrile | 50 | | | |
| ZnO | 6.75 | | | |
| Varox | 6 | | | |
| 5405 | 1 | | | |
| FK-140 | 12 | | | |
| A-151 | 1 | | | |
| Neolor Red S | 1 | | | |
| Liquid Nitrile | 50 | | | |
| TS-350 | 14 | | | |
| ZnO | 0.75 | | | |
| Varox | 6 | | | |
| B5405 | 1 | | | |

-continued

| | |
|---|---|
| Neolor Red S | 2 |
| Liquid Nitrile | 50 |
| FK 140 | 12 |
| ZnO | 0.75 |
| Varox | 6 |
| B5405 | 1 |
| A-151 | 1 |
| Neolor Red S | 1 |
| Liquid Nitrile | 50.0 |
| ZnO | 0.75 |
| FK 140 | 12.0 |
| B5405 | 1.0 |
| MBTS | 3.0 |
| TMTD | 1.6 |
| DPTH | 1.6 |
| Sulfur | 3.0 |
| 6630 | 0.6 |

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A liquid nitnie composition comprising:
   (a) at least 40 weight percent liquid nitrile rubber; and
   (b) at least 5 weight percent nonsulfur curing agent;
   wherein the composition contains at most 2% weight percent solvent.

2. A composition according to claim 1 wherein the curing agent is from 5% to 12% by weight of the composition.

3. A composition according to claim 1 wherein the curing agent is a peroxide.

4. A composition according to claim 1 wherein the liquid nitrile rubber is from 60% to 90% by weight of the composition.

5. A composition according to claim 1 additionally comprising:
   (c) solid nitrile rubber having a Mooney value of at most 75, said solid nitrile rubber providing at most 49 weight percent of said liquid nitrile rubber and said solid nitrile rubber as a combined total weight of rubber in said composition.

6. A composition according to claim 1 which is readily flowable from 23° C. to 150° C.

7. A composition according to claim 1 which is curable at a temperature of greater than 21 degrees C.

8. A composition according to claim 1 having a viscosity sufficient for application to a machine component to provide cure-in-place material for a sealing member of said component.

9. A composition according to claim 1 suitable for use in a gasket selected from the group of gaskets consisting of a cure-in-place gasket (CIPG), an inject-in-place gasket (IJPG), and a form-in-place gasket (FIPG).

10. A composition according to claim 1 suitable for use as a molding material for a molding process selected from the group of molding processes consisting of an liquid injection molding (LIM) process, a transfer molding (TM) process, and an injection molding process.

11. A liquid nitrile composition comprising:
    (a) at least 40 weight percent liquid nitrile rubber; and
    (b) at least 5 weight percent peroxide curing agent;
    wherein the composition contains at most 2% weight percent solvent; and
    wherein the composition is readily flowable from 23° C to 150° C.

* * * * *